US012273464B2

(12) United States Patent
Poeppelmann (10) Patent No.: US 12,273,464 B2
(45) Date of Patent: *Apr. 8, 2025

(54) PROVIDING A CRYPTOGRAPHIC INFORMATION

(71) Applicant: Infineon Technologies AG, Neubiberg (DE)

(72) Inventor: Thomas Poeppelmann, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,533

(22) Filed: Dec. 15, 2023

(65) Prior Publication Data

US 2024/0137225 A1    Apr. 25, 2024

Related U.S. Application Data

(63) Continuation of application No. 17/380,634, filed on Jul. 20, 2021, now Pat. No. 11,870,911.

(30) Foreign Application Priority Data

Jul. 24, 2020  (DE) .......................... 102020119569.9

(51) Int. Cl.
*H04L 9/32*        (2006.01)
*G06F 21/44*       (2013.01)
(Continued)

(52) U.S. Cl.
CPC .......... *H04L 9/3247* (2013.01); *H04L 9/0894* (2013.01); *H04L 9/3093* (2013.01); *H04L 9/3218* (2013.01)

(58) Field of Classification Search
CPC ... H04L 9/3247; H04L 9/0894; H04L 9/3093; H04L 9/3218; H04L 9/3236; G06F 21/602; G06F 21/44; G06F 21/45
See application file for complete search history.

(56) References Cited

U.S. PATENT DOCUMENTS 11,615,060 B2    3/2023   Alimi et al.
2011/0016325 A1  1/2011   Futa et al.
(Continued)

FOREIGN PATENT DOCUMENTS

DE    102018127126 A1    5/2019
DE    102019131745 A1    6/2020
(Continued)

OTHER PUBLICATIONS

Evaluation Criteria for True (Physical) Random Number Generators Used in Cryptographic Applications, by Killmann et al., published 2003. (Year: 2003).*

(Continued)

*Primary Examiner* — Vu V Tran
(74) *Attorney, Agent, or Firm* — Murphy, Bilak & Homiller, PLLC (57) ABSTRACT

Cryptographic information is compiled by: (a) determining a first portion of the cryptographic information based on an input and a randomness: (b) checking a rejection criterion based on the first portion; (b1) re-starting step (a) with a different randomness if the rejection criterion is fulfilled; (b2) if not all portions of the cryptographic information have been generated, determining a subsequent portion of the cryptographic information based on the input and the randomness and continuing with step (b) or, otherwise, continuing with step (c); (c) determining the first portion of the cryptographic information based on the input and the randomness; (d) conveying the respective portion of the cryptographic information; and (e) if not all portions of the cryptographic information have been generated, determining a subsequent portion of the cryptographic information based on the input and the randomness and continuing with step (d).

21 Claims, 5 Drawing Sheets

(51) Int. Cl.
  *G06F 21/45* (2013.01)
  *G06F 21/60* (2013.01)
  *H04L 9/08* (2006.01)
  *H04L 9/30* (2006.01)

(56) References Cited

U.S. PATENT DOCUMENTS

2014/0298038 A1* 10/2014 Gauravaram ......... H04L 9/0643
  713/189
2018/0091309 A1* 3/2018 Misoczki ............. H04L 9/3242

FOREIGN PATENT DOCUMENTS

EP    2030364 B1   8/2015
EP    3542336 B1   1/2021

OTHER PUBLICATIONS

Alkim, Erdem, et al., "NewHope", Version 1.02, 2017, 1-46.
Alkim, Erdem, et al., "NewHope without reconciliation", IACR Cryptology ePrint Archive 2016: 1157 (2016), 2016, 1-9.
Alkim, Erdem, et al., "Post-quantum Key Exchange—A New Hope", IACR Cryptology ePrint Archive 2015: 1092, 2015, 1-18.
Chen, Junhua, et al., "A Zero-Knowledge Identity Verification Protocol Using Blind Watermark", International Conference on Computer Engineering and Technology, 2009, 496-498.
Guneysu, Tim, et al., "Practical Lattice-Based Cryptography: A Signature Scheme for Embedded Systems", Horst Görtz Institute for IT-Security, Ruhr-University Bochum, Germany, CHES 2012, LNCS 7428, 2012, 1-61.
Harikrishnan;, M., et al., "Secure Digital Service Payments using Zero Knowledge Proof in Distributed Network", 2019 5th International Conference on Advanced Computing & Communication Systems (ICACCS), Mar. 2019, 307-312.
Kouicem, Djamel-Eddine, et al., "An Efficient and Anonymous Blockchain-Based Data Sharing Scheme for Vehicular Networks", 2020 IEEE Symposium on Computers and Communications (ISCC), Jul. 10, 2020, 1-28.
Lyubashevsky, Vadim, et al., "On Ideal Lattices and Learning With Errors Over Rings", Slides presented Eurocrypt 2010, 2010, 1-59.
Lyubashevsky, Vadim, "On Ideal Lattices and Learning with Errors Over Rings", Journal of the ACM, 60(6):43:1-43:35. Preliminary version in Eurocrypt 2010, Jun. 25, 2013, 1-34.
Oder, Tobias, et al., "Practical CCA2-Secure and Masked Ring-LWE Implementation", Horst Görtz Institute for IT Security, Ruhr-Universität Bochum, Germany, Jan. 23, 2018, 1-33.
Park, Young-Hoon, et al., "Fast and Secure Group Key Dissemination Scheme for Out-of-Range V2I Communication", IEEE Transactions on Vehicular Technology (vol. 64, Issue: 12), Dec. 2015, 5642-5652.
Schindler, Werner, et al., "Evaluation Criteria for True (Physical) Random Number Generators Used in Cryptographic Applications", 2003, 431-449.

* cited by examiner

PROVIDING A CRYPTOGRAPHIC INFORMATION

TECHNICAL FIELD

The present invention generally relates to cryptographic information, such as a cryptographic signature.

BACKGROUND

Embodiments of the present invention relate to an approach to efficiently compile cryptographic information, e.g., a signature.

Various internet and industry standards use asymmetric cryptography based on RSA or elliptic curve cryptography (ECC) to protect data communication between smart cards, smart phones, computers, servers, or industrial control systems. As an example, with the RSA algorithm a public-key encryption (PKE) scheme can be realized that allows sending an encrypted email (e.g., with PGP/GPG or S/MIME) to a recipient without the need to first exchange a symmetric key via a secure channel. Instead, the public key of the recipient is sufficient to achieve confidentiality.

Other applications of asymmetric cryptography are digital signatures, also based on RSA or ECC. They can be used to sign and verify data and the public key is used to check the validity of a signature.

Together, PKE and digital signatures are both crucial in the Transport Layer Security (TLS) protocol which is the backbone of secured communication in the Internet and used by browsers, smart phones and IoT (Internet of Things) devices. TLS establishes a secured channel between two devices where communication is encrypted, checked for manipulation, and where the identity of the participants is verified using a digital certificate provided through a public-key infrastructure (PKI). When connecting to a website, of a bank, using haps instead of http, the browser uses TLS. Commonly, a green lock and further information may be displayed to show that the communication is running with the bank's website and that attacks by a so-called man-in-the-middle are prevented. Without such PKI-based identity check in combination with strong data encryption it would be possible for attackers to manipulate the communication and to impersonate the accessed website.

However, it is known that RSA and ECC-based public keys might be subject to a successful attack using, e.g., quantum computers.

A quantum computer can be described as a computer that makes direct use of quantum-mechanical phenomena to accelerate processing. Crucial concepts to build a quantum computer are so-called quantum-bits or qubits that store a state in a quantum register. Such quantum computers may be used to successfully break cryptographic concepts that were considered sufficiently safe before such processing power was available.

Hence, there is a general motivation to move away from classical asymmetric cryptosystems (RSA/ECC) to schemes which cannot be successfully attacked by quantum computers. As a consequence, new solutions for signature schemes, key exchange, and public-key encryption are required that are not based on the same foundations as RSA and ECC (i.e., the discrete logarithm problem/factoring). This need for new technical solutions has already been acknowledged by standardization bodies like NIST (National Institute of Standards and Technology) investigating alternative cryptosystems.

A cryptosystem may be a cryptographic public key encryption, key exchange, or signature scheme or an advanced scheme like homomorphic encryption or attributed based encryption. In public-key encryption, a non-secret public key is used to encrypt data that can only be decrypted with the associated secret key. In signature schemes a secret key is used to sign a message and it can be verified with the associated public key that the signer was in possession of the secret key and thus authorized to produce the signature. Key exchange or key establishment is an interactive protocol where two parties establish a secret key that is unknown to a passive or sometimes active adversary or eavesdropper. Also, different options can be used combining public key encryption, key exchange, or signature schemes into protocols like, e.g., Transport Layer Security (TLS).

One class of schemes that is supposed to resist attacks by quantum computers are lattice-based cryptosystems. Lattice-based cryptosystems might become the successor of RSA and ECC and either operate on large matrices (standard lattices) or on polynomial rings (ideal lattices). For lattice-based cryptography, reference is made to, e.g., https://en.wikipedia.org/wiki/Lattice-based_cryptography.

A lattice is a structure that s created by integer linear combing s of basis vectors. Thus, a lattice can be described as a regular structure in an n dimensional space. Also, a lattice can be perceived as an arrangement of points in a Euclidean space with a regular structure. Given n linearly independent vectors $b_1, \ldots, b_n \in \mathbb{R}^m$, a lattice $\mathcal{L}$ generated by them is defined as $$\mathcal{L}(b_1, \ldots, b_n) = \{\Sigma x_i b_i | x_i \in Z\},$$

wherein $b_1, \ldots, b_n$ is a basis of the lattice and an element from $\mathbb{R}^m$ is a vector with m entries from $\mathbb{R}$.

In the lattice $\mathcal{L}$ (i.e., an n-dimensional space) certain fundamental problems, like finding a short basis or a short vector are conjectured to be computationally hard or at least complex enough to use them for cryptography. Usually, the hardness of breaking a lattice-based cryptosystem can be reduced or related to the hardness of solving such a fundamental problem. Lattice-based cryptography or a lattice-based cryptosystem is a cryptographic system whose security is based on the hardness or related to the hardness of certain mathematically hard problems in lattices.

Lattices may be used to construct cryptosystems. Lattice-based cryptography is also known with reference to the user-friendly learning with errors (LWE) problem and the ring-LWE (RLWE) problem. In this context a "problem" refers to a mathematical problem (e.g., finding something) that is conjectured to be hard to solve (i.e., no polynomial time algorithm is available) but that also allows the construction of a cryptographic scheme (e.g., like factoring problem for RSA or discrete logarithm for ECC).

In general, to solve an LWE problem, one has to recover a secret vector s over the ring of integer modulo q when given a set of approximate random linear equations on the secret vector s. Hence, the set of linear equations is distorted by a certain amount of randomness, which makes it hard for known algorithms to solve this set of equations.

The LWE and RLWE problems us allow constructing schemes where the actual lattice structure is not really visible to the designer of a scheme. However, when proving the security of LWE/RLWE based schemes, the lattice structure is used as well when trying to solve the LWE or RLWE problems as lattice algorithms are an efficient way to find the secret vector or polynomial s. This is also described as solving of a "lattice-problem". The RLWE problem works over polynomial rings and supports a security reduction to hard problems on ideal lattices while LWE enables reductions to arbitrary lattices. Ideal lattices carry more structure as not all lattices are ideal lattices but also allow the design of schemes that tail more practical public-key, ciphertext, and signature lengths.

Prominent examples of lattice-based cryptography are the so-called NTRU and NTRU-sign schemes as well as the so-called UGH (Goldreich-Goldwasser-Halevi, see, e.g., https://en.wikipedia.org.wiki/GGH_encryption_scheme) scheme. For most schemes, the conversion from public key encryption to key exchange is trivial. Additionally, for PKE various security levels like semantic security with respect to adaptive chosen plaintext (CPA) or semantic security with respect to adaptive chosen ciphertext attacks (CCA) can be achieved using standard conversions.

This has exemplarily been shown for the NewHope scheme that can also be instantiated as a CPA-secure or CCA-secure PKE [NewHopeNist17]. The NewHope-Simple and other schemes are a straightforward adaptation of a scheme called LPR10 (see [NewHopeSimplePaperEprint16]). Examples of lattice-based signature schemes are Dilithium, BLISS, GLP12, and qTESLA (see, e.g., https://csrc.nist.gov/Projects/Post-Quantum-Cryptography/Round-1-Submissions).

SUMMARY

An objective of several embodiments of the techniques and apparatuses described herein is to improve existing solutions and in particular to efficiently provide a cryptographic information. This is solved according to the features of the independent claims. Further embodiments result from the depending claims.

The examples suggested herein may in particular be based on at least one of the following solutions. Combinations of the following features may be utilized to reach a desired result. The features of the method could be combined with any feature(s) of the device, apparatus or system or vice versa.

An example method for compiling a cryptographic information according to some embodiments of the techniques described herein comprises:
- (a) determining a first portion of the cryptographic information based on an input and a randomness;
- (b) checking whether a rejection criterion based on the first portion of the cryptographic information is fulfilled;
- (b1) re-starting step (a) with a different randomness if the rejection criterion is fulfilled;
- (b2) if not all portions of the cryptographic information have been generated, determining a subsequent portion of the cryptographic information based on the input and the randomness and continuing with step (b) or, if all portions of the cryptographic information have been generated, continuing with step (c);
- (c) determining the first portion of the cryptographic information based on the input and the randomness;
- (d) conveying the respective portion of the cryptographic information;
- (e) as long as not all portions of the cryptographic information have been generated, determining a subsequent portion of the cryptographic information based on the input and the randomness and continuing with step (d).

The randomness may comprise at least one of a true-randomness, a pseudo-randomness or a deter deterministic feature.

According to some embodiments, the cryptographic information is or comprises at least one of the following:
- a signature;
- a pairing information;
- an information associated with a zero-knowledge-proof.

According to some embodiments of the methods described above, the respective portion of the cryptographic information is encrypted with a secret key, prior to step (d), and the method further comprises conveying the secret key. According to some embodiments, the secret key is conveyed after the last encrypted portion of the cryptographic information has been conveyed.

According to some embodiments, the input is a message.

According to some embodiments, the method further comprises:
- for each portion of the cryptographic information determined by the loop of steps (a) to (b2), generating and storing a first hash value that is associated with the respective portion of the cryptographic information;
- within the loop of steps (c) to (e) generating a second hash value for each portion of the cryptographic information and comparing the second hash value with the first hash value that is associated with the same portion of the cryptographic information; and
- continuing only if the first hash value corresponds to the second hash value.

According to some embodiments in case the first hash value does not correspond to the second hash value, the method comprises triggering at least one of the following actions:
- issuing a notification an alarm;
- stopping the method;
- entering an exception handling;
- re-starting step (a) with a different randomness.

According to some embodiments, the method further comprises not storing more than one portion of the cryptographic information at one time when processing the loop determined by steps (a) to (b2).

According to some embodiments, the cryptographic information is compiled based on the portions of the cryptographic information conveyed.

According to some embodiments the method comprises conducting an authentication based on the cryptographic information.

According to some embodiments, processing the cryptographic information or a portion of the cryptographic information utilizes at least one cryptographic Lattice operation.

According to some embodiments, the method is used on a security device or for operating a security device, wherein such security device comprises at least one of the following:
- an integrated circuit,
- a hardware security module,
- a trusted platform module,
- a crypto unit,
- a FPGA,
- a processing unit,
- a controller.
- a smartcard.

Further embodiments of the apparatuses and techniques described herein include a security device for compiling a cryptographic information, where the security device comprises circuitry arranged to execute the steps:
- (a) determining a first portion of the cryptographic information based on an input an a randomness;

(b) checking whether a rejection criterion based on the first portion of the cryptographic information is fulfilled;

(b1) re-starting step (a) with a different randomness if the rejection criterion is fulfilled;

(b2) if not all portions of the cryptographic information have been generated, determining a subsequent portion of the cryptographic information based on the input and the randomness and continuing with step (b) or, if all portions of the cryptographic information have been generated, continuing with step (c);

(c) determining the first portion of the cryptographic information based on the input and the randomness;

(d) conveying the respective portion of the cryptographic information, (e) as long as not all portions of the cryptographic information have been generated, determining a subsequent portion of the cryptographic information based on the input and the randomness and continuing with step (d).

Also, a consumable is suggested comprising the security device as described herein. In addition, a system is suggested comprising the security device as described herein and a host, wherein the security device is arranged to convey the respective portion of the cryptographic information to the host. According to an embodiment, the host is arranged to authenticate the security device based on the portions of the cryptographic information received.

Also a computer program product is provided, which is directly loadable into a memory of a digital processing device, comprising software code portions for performing the steps of the method as described herein.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

The solutions described herein apply to classical cryptosystems as well as post-quantum cryptosystems.

Technical Challenges Concerning Lattice-Based Cryptography

When realizing lattice-based cryptography and lattice-based cryptosystems on a computer, a microcontroller, an integrated circuit, in a hardware-software co-design or as fixed circuit, multiple technical challenges arise when performing cryptography operations (e.g., signing, encryption, decryption, verification, key generation). Examples of such technical challenges arising in the field are:

Achieve improved performance by performing steps of a cryptosystem using specifically optimized sequence of operations and by using all features of the available target hardware (special registers or instructions).

Performing a cryptographic operation using a minimal amount of volatile or non-volatile memory.

Realizing a cryptographic operation, or parts thereof, with a minimum amount of logic circuitry and memory cells (e.g., formed by a CMOS process) given a performance target.

Efficient and comprehensive protection against implementation attacks (also referred to as physical attacks, observatory attacks, invasive and semi-invasive attacks).

It s noted that protection against implementation attacks and/or physical attacks is in particular advantageous for cryptosystems that are executed on a security controller or in any adverse environment (e.g., a Hardware Security Module, HSM).

Possible attacks are side-channel attacks where an attacker tries to obtain secret information by observing the physical behavior of a device, like power consumption (e.g., simple or differential power analysis (SPA/DPA)), electric emanation, or temperature. Moreover, fault-attacks are a feasible where an attacker tries to introduce disturbances (e.g., with a laser) in the execution flow or data to obtain secret nation or to influence the behavior of the device.

It is a feature of an implementation attack that such attack does not exploit a weakness in the mathematical description of a scheme (which would be considered cryptanalysis), but in the way the scheme is realized on a specific device. In general, the adversary is considered to have access to the device when performing an implementation attack.

Usually, a device like a smart card is constructed in a way that physical effects (e.g., power consumption or radiation) are disguised to make it hard to obtain security critical assets. A common approach to counter physical attacks is an execution on randomized values to prevent invasive and non-invasive attacks that pursue the objective of extracting a secret key or an intermediate value from the device. However, it is a technical challenge to realize such randomizations or redundancy in an efficient way and without opening up further attack opportunities. Various embodiments of the techniques and apparatuses described herein are designed to address this challenge.

Notation and Abbreviations

In particular, the following notations, abbreviations and references are used:

q is an integer, k is an integer, n is an integer, mod q is the modulo operation modulo q defined over the integers where the result is in the range $[0, q-1]$, Z are the integers (number written without a fractional component); for a definition of "number", reference is made to https://en.wikipedia.org/wiki/Number; for a definition of "fractional component", reference is made to https://en.wikipedia.org/wiki/Fraction_(mathematics), ℝ are the real numbers (a value of a continuous quantity which may represent a distance along a line), $Z_q$ is the ring of integers modulo q which is the quotient ring Z/qZ; of equivalence classes of integers modulo q X is an indeterminate, f is a polynomial of maximum degree of integer n, R=Z[X]/(f) is a ring of integer polynomials modulo f; the elements v∈Z[X]/(f) can be represented by integer polynomials of a degree less than the integer n or alternatively as a vector of coefficients v∈Z$^n$.

$R_q$=$Z_q$[X]/(f) is a ring of integer polynomials modulo both the polynomial f and the integer q; the elements v∈$Z_q$[X]/(f) can be represented by integer polynomials of degree less than n with coefficients reduced modulo q or alternatively as a coefficient vector v∈$Z_q^n$, v∈$R_q$ is a polynomial (written in bold) that is an element in $R_q$, v[i] is a coefficient of a vector or polynomial v∈$R_q$ at a position i, θ is an error distribution, ←$^\$$ random sampling from a set or distribution, $D_{Z,\sigma}$ discrete Gaussian distribution over the integers with standard deviation σ, $\Psi_k$ binomial distribution with integer parameter k, U( ) uniform distribution, $1001_b$ a number in binary notation, such that $1001_b$=9, U($R_{q,k}$) uniformly random sampling of a polynomial in $R_q$ where all coefficients are uniformly random in [−k, k].

FFT Fast Fourier Transform,

NTT Number Theoretic Transform,

DPA Differential Power Analysis,

SPA Simple Power Analysis,

ALU Arithmetic Logic Unit,

PKE Public Key Encryption,

KEM Key Encapsulation Mechanism,

CCA Chosen Ciphertext Attack,

CPA Chosen Plaintext Attack,

IND Indistinguishability.

The quotient ring is a construction in abstract algebra; for details, reference is made to, e.g., https://en.wikipedia.org/wiki/Quotient_ring.

Ideal Lattices and Polynomial Arithmetic

Currently, there exist two flavors of lattice-based cryptography, i.e. ideal lattice-based cryptography and standard lattice-based cryptography, A middle ground is a so-called modular lattice-based cryptography that mixes concepts from ideal and standard lattices. Reference is made to, [NewHopeNist17].

The basic operations in ideal lattice-based cryptography are polynomial multiplications, additions, or subtractions in the quotient ring $R_q$=$Z_q$[x]/(f)

where the modulus q is an integer and the dimension (number of coefficients) is an integer n. A polynomial a∈$R_q$ can be represented as an array of values and a single value a[i] at an integer position i can be accessed. All major computations in lattice-based cryptosystems schemes may be performed on arrays of values modulo q.

For the quotient ring, operations like addition and multiplication can be defined. An addition c=a+b for a, b, c∈$R_q$ may be defined as $$c = \sum_{i=0}^{n-1}(a[i]+b[i]\bmod q) \cdot X^i$$

where i is an integer, q is an integer, a[i] is the i-th coefficient of a, b[i] is the i-th coefficient of b and X is the indeterminate, A subtraction c=a−b works in the same manner with "+" being replaced by "−".

The product c=a·b of polynomials a, b, c∈$R_q$ can also be computed. It is defined as a normal polynomial multiplication (sometimes also called "schoolbook" multiplication) followed by a reduction modulo the polynomial f and a reduction modulo the integer q, i.e.

$$c = \left(\sum_{i=0}^{n-1}\sum_{j=0}^{n-1}a[i]b[j]x^{i+j}\bmod q\right)\bmod f.$$

The formula for polynomial multiplication can be simplified by considering the special rule that $x^n \equiv -1$ when $f=x^n+1$ but similar polynomials may be used accordingly:

$$c = \sum_{i=0}^{n-1}\sum_{j=0}^{n-1}(-1)^{\lfloor \frac{i+j}{n} \rfloor}a[i]b[j]x^{i+j \bmod n}\bmod q$$

where i and j are integers, q is an integer, a[i] is the i-th coefficient of a, b[j] is the j-th coefficient of b and x is the indeterminate.

Sparse Multiplication

Some efficiency for polynomial arithmetic can be gained with algorithms that exploit specific properties of polynomials. As an example, a polynomial s∈$R_q$ may only have few coefficients that are non-zero, it may also only consist of coefficients that are either one or minus one, or it play in general have coefficients that are small. Also, it may exhibit a combination of such properties.

The Number Theoretic Transform (NTT)

An implementation following this formula would require $n^2$ modular multiplications and would thus be rather expensive.

Another approach for fast polynomial multiplication is the number theoretic transform (NTT). The NTT is basically a fast Fourier transformation (FFT) defined over a finite field or ring. Thus, all complex roots of unity of the FFT are exchanged for integer roots of unity and computations are carried out in the ring of integers modulo an integer q. A polynomial multiplication for a, b, c∈$R_q$ using NTT can be computed as c=a·b=NTT$^{-1}$(NTT(a)∘NTT(b))

where "∘" denotes a coefficient-wise multiplication, â=NTT (a) is the transformation of the polynomial a, b̂=NTT (b) is the transformation of the polynomial b, and NTT$^{-1}$( ) is the inverse transformation. The coefficient-wise multiplication ĉ=â∘b̂ for â, b̂, ĉ∈$Z_q$[x] can be defined as $$\hat{c} = \sum_{i=0}^{n-1}(\hat{a}[i] \cdot \hat{b}[i]\bmod q) \cdot X^i.$$

The advantage of the NTT is that a polynomial multiplication operation only requires roughly n $\log_2$ n modular multiplications when an efficient algorithm is used and that a reduction modulo $f=x^n+1$ (the so-called circular convolution property) or a reduction modulo $$f = x^n - 1$$

can be integrated into the NTT algorithm, Thus an n-point NTT is sufficient to work with n-coefficient polynomials.

To formally introduce the NTT, the choice of parameters may be restricted; also, the following may be set such that the NTT exists:

$$f = x^n + 1$$

and $$q \equiv 1 \bmod 2n.$$

Further, a polynomial may be defined as follows $$g = \sum_{i=0}^{n-1} g[i] X^i \in R_q$$

such that $$NTT(g) = \hat{g} = \sum_{i=0}^{n-1} \hat{g}[i] X^i$$

with $$\hat{g}[i] = \sum_{i=0}^{n-1} \gamma^j g[i] \omega^{ij} \bmod q,$$

where the integer $\omega$ is an 2n-th primitive root of unity modulo q and integer $\gamma = \omega \bmod q$. So $\gamma$ is a square root of $\omega$ modulo q.

The inverse transformation works similar. For a polynomial $\hat{g} \in R_q$ it can be defined as:

$$NTT^{-1}(\hat{g}) = g = \sum_{i=0}^{n-1} g[i] X^i$$

with $$g[i] = \left( n^{-1} \gamma^{-1} \sum_{i=0}^{n-1} \hat{g}[j] \omega^{-ij} \right) \bmod q.$$

A straightforward computation of the NTT with the previously given definition has quadratic complexity and is not more efficient than the schoolbook approach. Thus, to realize fast polynomial multiplication using the convolution theorem, a fast algorithm to compute the NTT is required. This can be achieved via an implementation of the NTT with O(n log n) operations in $Z_q$, e.g., by the Cooley-Tukey radix-2 decimation-in-time (DIT) algorithm (see, e.g., https://en.wikipedia.org/wiki/Cooley%E2%80%93Tukey_algorithm) or by a decimation-in-frequency (DIF) algorithm. The DIT NTT algorithm recursively splits the computation into a sub-problem on the even inputs and a sub-problem on the odd inputs of the NTT.

Crypto Engine/Consumable and Outside

Examples described herein allow for a crypto engine, which may be part of a hardware unit like a controller or it may be a hardware unit on its own, to supply a cryptographic information. This cryptographic information may be, e.g., a signature, The approach can also be used for zero-knowledge proofs or pairing operations. The crypto engine may be a cryptographic engine capable of conducting at least one cryptographic operation.

The crypto engine may be a chip or part of a chip. The crypto engine may be part of a microcontroller, it may in particular be run within a microcontroller or any processing device. The crypto engine, the microcontroller or the processing device may be embedded in a car, an industrial (control) device or engine, a medical device, a sensor, etc. The crypto engine may be attached to a so-called "consumable" that provides, e.g., a signature to another entity, referred to as an outside entity (or short as "outside", also referred to as host or host device).

The consumable may provide something for the host "to consume". There exist many examples for combinations of consumable and host, e.g.:
  printing cartridge—printer;
  batterie—device using the batterie;
  refill cartridge—electronic cigarette;
  credit, balance card—prepaid handy;
  coffee capsule—coffee maker;
  filter cartridge—water filter;
  medical supply—medical device.

The consumable may be physically connected to the host. The host may be configured to authenticate the consumable and the host may be further configured to utilize the consumable only in case of a successful authentication.

It may also be an option that the crypto engine is attached to or part, of a device, wherein such device uses the crypto engine for authentication purposes with, e.g., a cloud or a network.

Efficient Compiling of Cryptographic Information

The solution presented herein allows the crypto engine to cope with small physical memory and still participate in cryptographic operations that involve computations on, e.g., large data, e.g., keys.

A signing process may comprise the following steps:
  (1) A signature portion $\text{sig}_i$ is generated based on a message m and a randomness $k_e$.
  (2) A rejection sampling is conducted for the signature portion by testing (at least one) statistical property thereof.
  (2a) If the test fails, the signature portion $\text{sig}_i$ is rejected, i.e. the rejection criterion is fulfilled. In such case, a different randomness is used and the generation of the signature portions is restarted.
  (2b) If the test succeeds, i.e. the rejection criterion is not fulfilled, the signature portion $\text{sig}_i$ is accepted. The generation of the signature is continued with the next signature portion $\text{sig}_j$ (j=i+1) and it is branched off to step (2) as long as the generation of the signature is not completed (i.e. as long as not all signature portions have been generated).

It is noted that the signature portion $\text{sig}_i$ is different from the signature portion $\text{sig}_j$.

Examples described herein avoid computation results being visible outside of a security boundary of a crypto engine in case the rejection sampling reveals that the statistical properties of the computed cryptographic information, e.g., said signature, do not meet predefined requirements.

The computation may advantageously be split into parts thereby supplying individual results in a serial manner.

As an option, these individual results may be encrypted and only sent across the security boundary of the crypto engine after being encrypted.

For each signature portion $\text{sig}_i$ it is determined whether this portion fulfills or does not fulfill the rejection criterion. The signature portions are only conveyed from the crypto engine in case none of the signature portions s fulfills the rejection criterion. Otherwise, different signature portions are determined based on a different randomness $k_e$, which are then subject to the rejection criterion. If none of the signature portions $sig_i$ is rejected, these signature portions $sig_i$ are calculated again and are then supplied one after the other from the crypto engine to a different entity, e.g., a terminal. This entity is then able to combine, e.g., concatenate, the signature portions $sig_i$ received into a full signature sig.

This allows for the crypto engine to use only limited resources when compiling and providing the signature, e.g., as part of an authentication. This may especially be useful for crypto engines with limited memory space and/or limited electrical energy stored in or accessible to the crypto engine.

Figure 1:
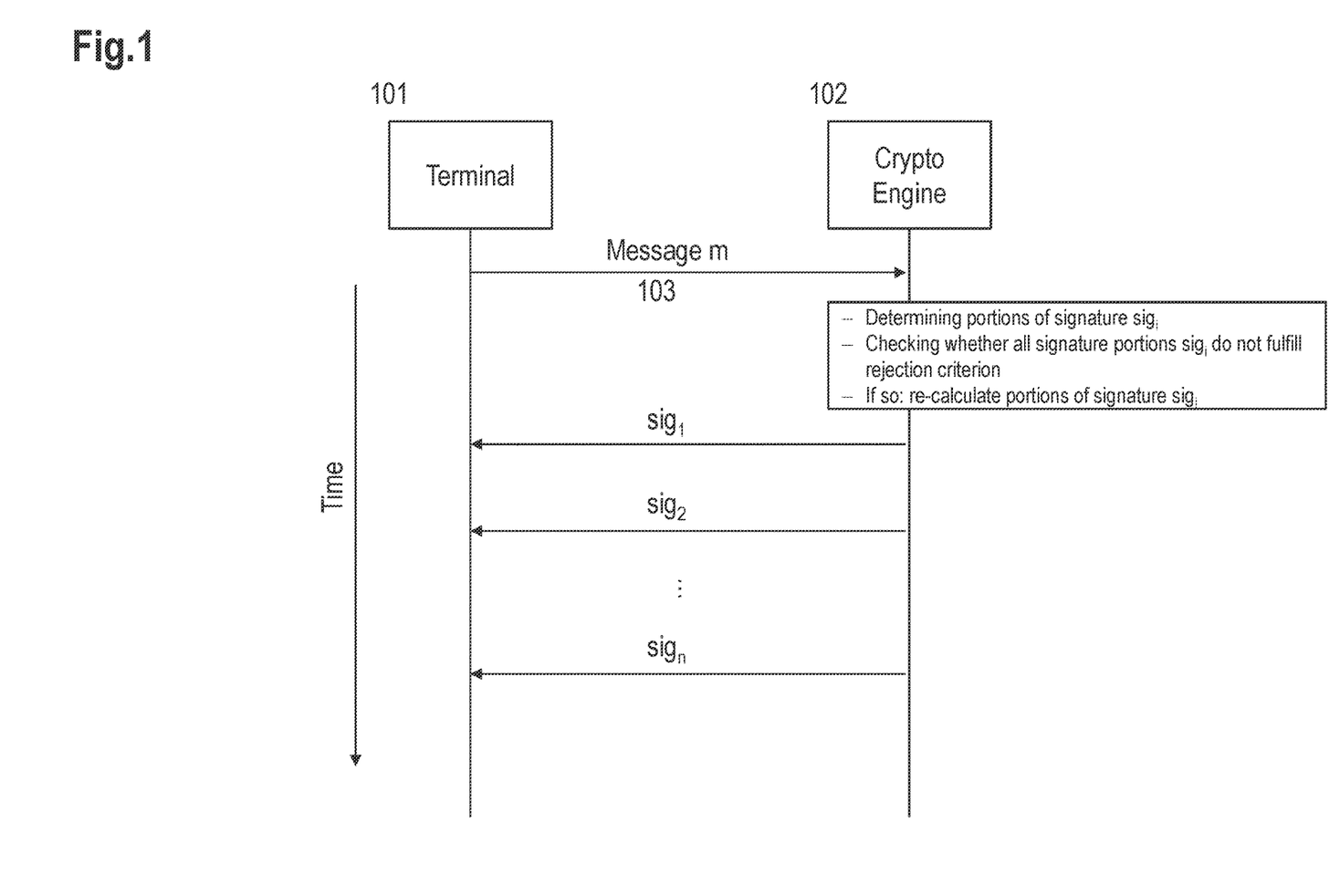
FIG. 1 illustrates a process of compiling and supplying a signature from a crypto engine to a terminal.

FIG. 1 visualizes the process of compiling and supplying a signature from a crypto engine 102 to a terminal 101 (which his example serves as host or as an "outside"). The terminal 101 may be any device external to the exemplary crypto engine 102. The crypto engine 102 may be a smart card or any device with a secure environment. The crypto engine 102 may be attached to or combined with a consumable as described above.

The terminal 101 supplies a message 103 for which as signature has to be provided by the crypto engine 102. The signature may then be used for authentication purposes. The crypto engine 102 may comprise the following:

a cryptographic function "sign" to compile the signature;
generating or obtaining a randomness $k_e$, which may be an ephemeral key;
a private key $k_s$ used for the cryptographic function;
optional: a symmetric key $k_j$ used for an encryption function encr (the symmetric key $k_j$ may be generated locally, e.g., chosen randomly, pseudo-randomly or in a deterministic manner).

It is noted that the randomness $k_e$ may comprise at least one of a true-randomness a pseudo-randomness or a deterministic feature. The randomness may be generated by the crypto engine based on a seed or any true or pseudo random number or characteristics. The crypto engine may in particular be able to determine a multitude of different numbers each representing a (different) randomness.

It is further noted that the private key $k_s$ may be stored in a memory of the crypto engine 102 or it may be hard-wired. It is an option, that the private key $k_s$ is determined based on a seed that is either stored or hard-wired within the crypto engine 102.

As an alternative, the message m may be provided by any component other than the terminal 101.

The crypto engine 102, compiles signature portions $sig_i$ based on the message m, the private key $k_s$ and the randomness $k_e$. For each signature portion $sig_i$ it is checked whether or not it fulfills a rejection criterion. If it does, the signature generation is restarted with a different randomness $k_e$. If none of the signature portions $sig_i$ fulfils the rejection criterion, the signature portions $sig_i$ are re-calculated and then supplied from the crypto engine 102 to the terminal 101.

This bears the advantage that after all signature portions $sig_i$ have been determined in the first round, it became apparent that none of these signature portions $sig_i$ fulfils the rejection criterion. Hence, none of the signature portions $sig_i$ could be used by an attacker to determine or derive the secret key used by the cryptographic function sign. Therefore, each of the signature portions $sig_i$ are admissible to leave the secure domain of the crypto engine 102 and can be transmitted to the terminal 101.

However, it is an option to use the symmetric key $k_j$ and the encryption function encr to encrypt at least one of the signature portions $sig_i$ leaving the crypto engine 102 (towards the terminal 101). After the last signature portion $sig_i$ has been conveyed to the terminal 101, the crypto engine 102 may then send the symmetric key $k_j$ to enable the terminal 101 to decrypt the signature portions that it has already received. This option adds a layer of security because the terminal 101 is only able to decrypt the signature portions and thus determine the full signature after it has received the symmetric key $k_j$ from the crypto engine 102.

Figure 2:
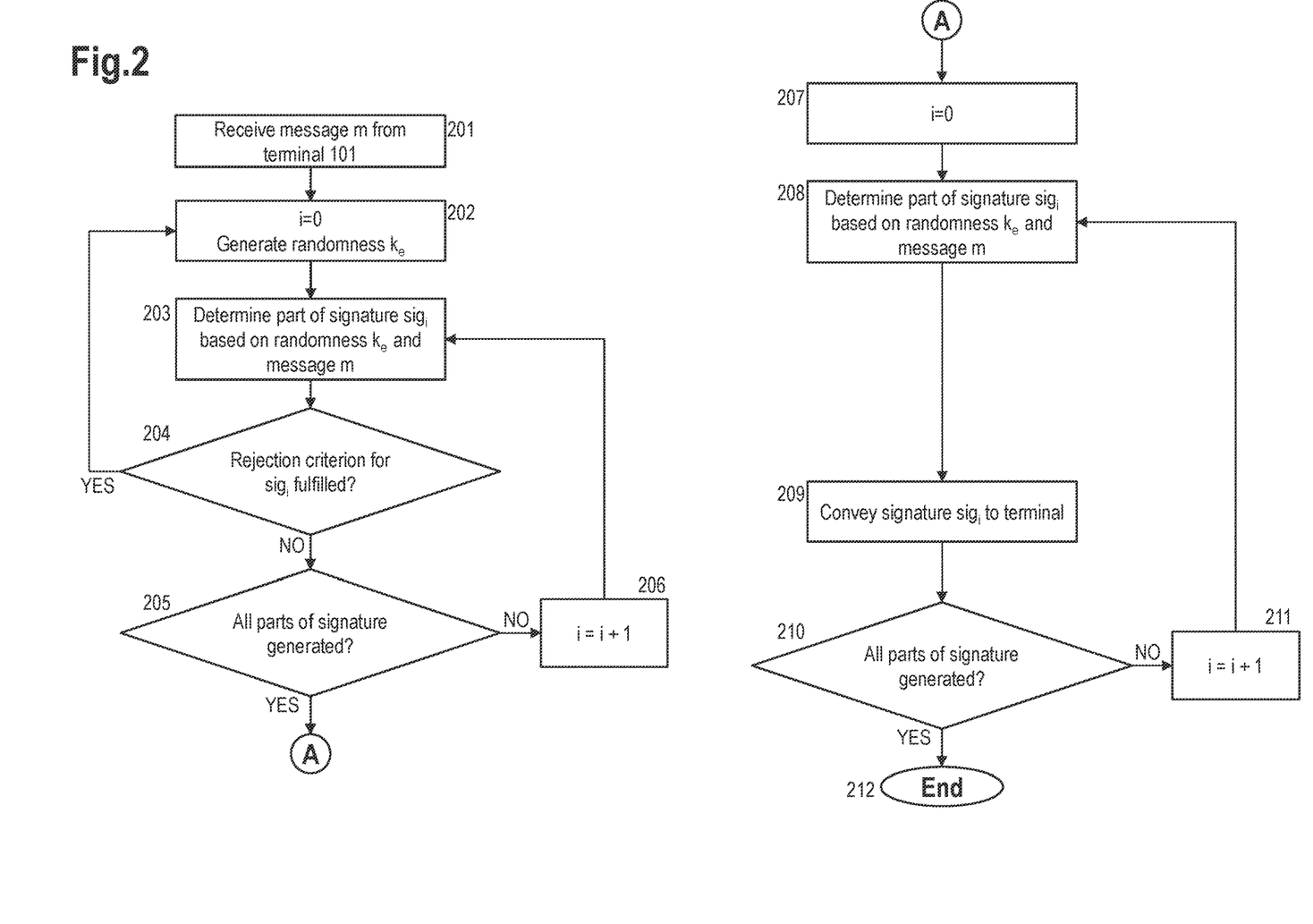
FIG. 2 shows an exemplary flow chart with steps of a method to be run on, e.g., a crypto engine.

FIG. 2 shows an exemplary flow diagram for compiling the signature at the crypto engine 102 and forwarding signature portions to the terminal 101:

Sty 201: The crypto engine 102 receives a message m from the terminal 101.

Step 202: A counter i is initialized (i.e., set to 0). A randomness $k_e$ is generated.

Step 203: A signature portion $sig_i$ is determined based on the randomness $k_e$ and the message m using the cryptographic function sign:

$sig_i = sign(m, k_e, i)$.

It is noted that the function sign generates a partition based on the value of the counter i.

Hence, the message m may be processed to determine several signature portions $sig_i$ depending on the value of the counter i.

The function sign may use a private key $k_s$ to compile the signature.

The randomness $k_e$ may be generated locally at the crypto engine 102. It may be the case that the generated randomness $k_e$ is not suitable, because it may be cryptographically "weak" in a way that a signature portion $sig_i$ that is compiled using this particular randomness $k_e$ allows an attacker to derive details about the secret key $k_s$ and/or details about the cryptographic function sign. A signature portion $sig_i$ that, is compiled using a weak randomness $k_e$, however, may preferably not leave the domain of the crypto engine 102.

Hence, the rejection criterion is used to detect any unsuitable signature portion $sig_i$, which results in restarting the compilation of the signature portions with a different (hopefully more suitable) randomness $k_e$:

Step 204: It is checked whether the signature portion $sig_i$ fulfills the rejection criterion. If this is the case, the process is restarted, i.e., it is branched to step 202, compiling the signature portions with a different randomness $k_e$.

An exemplary rejection criterion may be as follows: One component of the signature, e.g., a coefficient $x_i$ of a polynomial $x \in R_q$ may be larger than a threshold t. If any $x_i \in R_q$ is larger than the threshold t, the rejection criterion is positive (i.e. fulfilled).

If the signatures portion $sig_i$ does not fulfill the rejection criterion, there is no rejection and it is continued with the subsequent step 205.

Step 205: It is checked whether all signature portions have been compiled. If this is the case, it is branched to a step 207. If not all signature portions have been compiled, it is branched to a step 206.

Step 206: The counter i is incremented by one and it is continued with step 203, i.e. determining the next signature portion $sig_i$.

It is noted that after all signature portions have been compiled (before step 207 is entered), the rejection criterion has been successfully tested for each of the signature portions, i.e. none of the signature portions $sig_i$ triggered the rejection criterion. Hence, the signature comprising the signature portions $sig_i$ is deemed valid and suitable to be conveyed outside of the crypto engine 102. However, up to now, the signature portions have not been conveyed to the terminal 101 and they might have not been stored in a memory due to memory restrictions of the crypto engine 102. Hence, the signature portions will be calculated again in the next steps based on the same randomness $k_e$ and then directly be conveyed to the terminal 101:

Step 207: The counter i is reset (i.e., set to 0).

Step 208: This step 208 corresponds to step 203 above: The signature portion $sig_i$ is determined.

Step 209: The signature portion $sig_i$ is conveyed to the terminal 101.

Step 210: It is checked whether all signature portions have been compiled. If this is the case, it, is branched to a step 212. If not all signature portions have been compiled, it is branched to a step 211.

Step 211: The counter i is incremented by one and it is continued with step 208, i.e., determining the next signature portion $sig_i$.

Step 212: The provision of the signature for the terminal 101 is finished.

Figure 3:
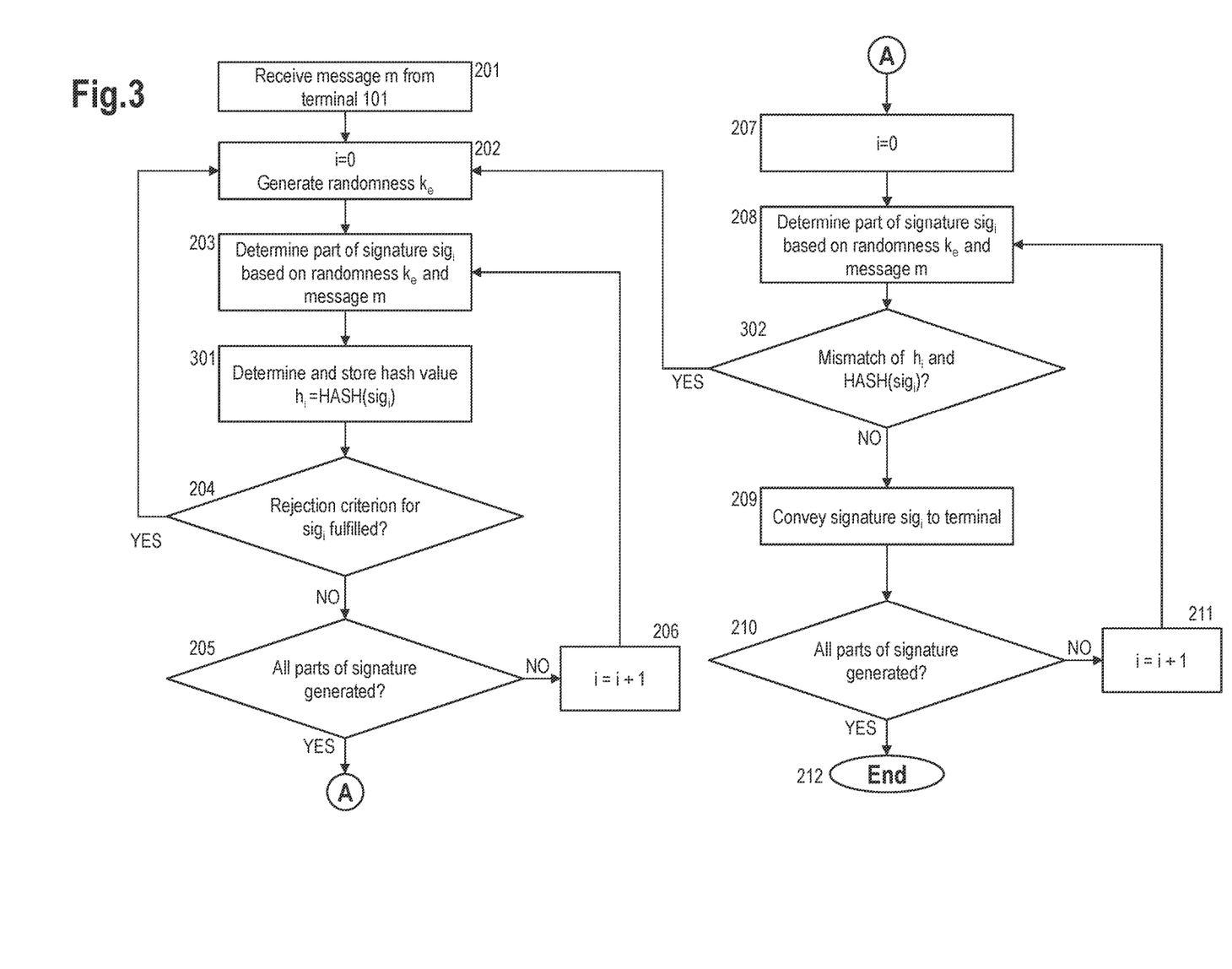
FIG. 3 shows an alternative embodiment to the example of FIG. 2.

FIG. 3 shows an alternative embodiment for compiling the signature at the crypto engine 102 and forwarding signature portions to the terminal 101. The flow chart of FIG. 3 is based on FIG. 2. In contrast to FIG. 2, a step 301 is entered between the steps 203 and 204 and a step 302 is entered between the steps 208 and 209. These added steps 301 and 302 provide the following features:

Step 301 A hash value h is determined based on the signature portion $sig_i$:

$$h_i = \text{HASH}(sig_i),$$

wherein HASH( ) is a hash function, e.g., a one-way-function that determines a hash value based on an input.

Also, the hash value $h_i$ is stored for further comparison purposes (see step 302), Hence, after the step 205, a hash value $h_i$ has been calculated and stored for each of the signature portions $sig_i$.

Step 302: For each of the signature portions $sig_i$, the previously stored hash value $h_i$ is compared with a hash value $\text{HASH}(sig_i)$ calculated based on the signature portion $sig_i$ determined in step 208.

Hence, it is checked whether the steps 203 and 208 product the same signature portions by comparing their hash values.

If the hash values are the same, no tampering or attack is detected and next is step 209. If the hash values do not match, it is branched to step 202 restarting the compilation of the signature portions with a different randomness $k_e$.

The option shown in FIG. 3 is an extension of the integrity check: In the first loop comprising the steps 202, 203, 301, 204, 205 and 206 hash values $h_i$ are calculated for each of the signature portion $sig_i$. In the second loop comprising the steps 208, 302, 209, 210 and 211 again a hash value is calculated for each signature portion and compared to the previously calculated hash value $h_i$. In case a discrepancy occurs, the integrity of associated signature portion is compromised and the process of compiling the signature portions is restarted.

An option that may be applied in combination with either the approach shown in FIG. 2 or the alternative approach shown in FIG. 3 is that at least one of the signature portions $sig_i$ is encrypted before being conveyed from the crypto engine 102 to the terminal 101, For example, a symmetric encryption function encr and a symmetric key $k_j$ can be used to obtain an encrypted signature portion $sig_{i\_enc}$:

$$sig_{i\_enc} = \text{encr}(sig_i, k_j)$$

The encrypted signature portion $sig_{i\_enc}$ is conveyed to the terminal 101 all signature portions are conveyed to the terminal 101, the crypto engine 102 may then convey the symmetric key ki to the terminal 101 to enable the terminal 101 to decrypt the signature for further processing.

Hence, the terminal 101 can determine the signature of the message m by concatenating the signature portions $sig_i$ and in this example also applying a decryption using the symmetric key $k_j$.

This optional feature ensures that the terminal 101 is only then able to decrypt the encrypted signature portions after it has received the symmetric key $k_j$.

It is an option that the symmetric key $k_j$ is generated by the crypto engine and used for each signature or for a predetermined number of signatures. It is also an option that the symmetric key $k_j$ is used only for a predetermined number of signature portions. Accordingly, the crypto engine 102 may provide at least one symmetric key (in particular several symmetric keys) to the terminal 101.

In an exemplary use case, the terminal 101 can determine whether the crypto engine 102 (or the consumable that is associated with this crypto engine 102) has been successfully authenticated. If this is the case, the terminal 101 may proceed and, e.g., utilize the resource provided by the consumable to which the crypto engine 102 is attached.

Further Advantages and Embodiments

Examples described herein may be used in hardware modules, e.g., said crypto engines. The hardware module may be any hardware accelerator, enabling the hardware module to require less internal memory space. The hardware module may be or comprise a security module, e.g., an integrated security module, also referred to as hardware security module (HSM), or a controller with or without an authentication module.

Inputs may be streamed to the hardware module. The hardware module compiles the results, preferably only storing a portion of the data and/or what is required for the calculation itself. By splitting the calculation into parts, the whole challenge and/or response does not have to be stored at once in the hardware module. Instead, only portions may be stored and (sequentially) computed.

Hence, it is not necessary for the hardware module to supply a memory large enough for storing the result of the full computation.

The calculation conducted by the hardware module can thus be split into multiple parts, which may be executed serially without the need for all prior or future information to be available. "Prior or future information" refers to information that was required for previous computations or will be provided for future computations.

Advantageously, the result of the calculation conducted by the hardware module may be kept secret depending on a condition that becomes fulfilled (or not) at the end several of the calculations. Only if the condition is fulfilled and a rejection criterion is not met, the (full) result of the calculation becomes apparent to the outside of the hardware module.

The outside of the hardware module may be any entity that is able to communicate with the hardware module.

The approach presented herein may be applied in combination with a Dilithium signature (see, e.g., https://pq-crystals.org/dilithium/data/dilithium-specificationround2.pdf) or with other signature algorithms (other lattice based algorithms submitted to the running NIST contest for PQ crypto as well as other algorithm that share a similar structure).

The solution(s) described herein may be combined with the GLP protocol. In [T. Güneysu, V. Lyubashevsky, T. Pöppelmann, Practical Lattice-Based Cryptography: A Signature Scheme for Embedded System, CHES 2012, LNCS 7428, pp. 530-547, 2012] a signature scheme is proposed.

For example, the hardware module may be an authentication module for which secrets may have to be stored outside this module. For example, the authentication module may be integrated with a non-secure controller. The secret keys may be stored encrypted in the non-secure controller for later use.

The examples described may in particular be used in combination with Lattice-based cryptography. The hardware module may require much less memory than it would require for fully calculating the respective cryptographic operation (e.g., signature).

Implementation Examples

Figure 4:
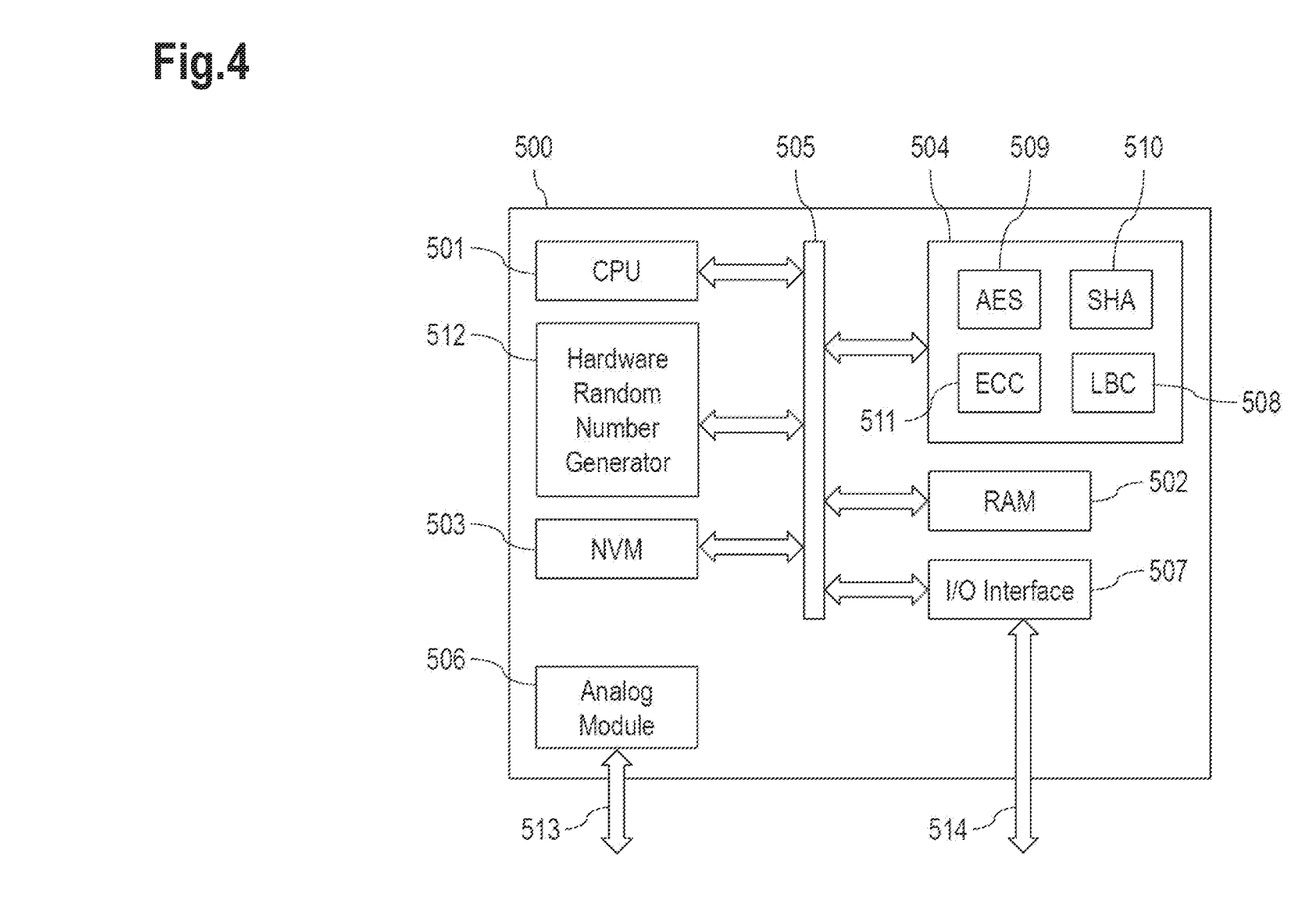
FIG. 4 shows an exemplary arrangement of a processing device comprising a CPU, a RAM, a non-volatile memory, a crypto module, an analog module, an input/output interface and a hardware-random number generator.

FIG. 4 shows a processing device 500 comprising a CPU 501, a RAM 502, a non-volatile memory 503 (NVM), a crypto module 504, an analog module 506, an input/output interface 507 and a hardware-random number generator 512.

In this example, the CPU 501 has access to at least one crypto module 504 over a shared bus 505 to which each crypto module 504 is coupled. Each crypto module 504 may in particular comprise one or more crypto cores to perform certain cryptographic operations. Exemplary crypto cores are:
 an AES core 509,
 a SHA core 510,
 an ECC core 511, and
 a lattice-based crypto (LBC) core 508.

The lattice-based crypto core 508 may be provided in order to conduct or accelerate lattice-based cryptography.

The CPU 501, the hardware random number generator 512, the NVM 503, the crypto module 504, the RAM 502 and the input/output interface 507 are connected to the bus 505. The input output interface 507 may have a connection 514 to other devices, which may be similar to the processing device 500.

The crypto module 504 may or may not be equipped with hardware-based security features. As an option, the crypto module 504 may comprise a random number generator.

The analog module 506 is supplied with electrical power 513 via an electrical contact and/or via an electromagnetic field. This power is supplied to drive the circuitry of the processing device 500 and may in particular allow the input/output interface to initiate and/or maintain connections other devices via the connection 514.

The bus 505 itself may be masked or plain. Instructions to process the steps described herein may in particular be stored in the NVM 503 and processed by the CPU 501. The data processed may be stored in the NVM 503 or in the RAM 502. Supporting functions may be provided by the crypto modules 504 (e.g., expansion of pseudo random data). Random numbers may be supplied by the hardware-random number generator 512.

Steps of the method described herein may exclusively or at least partially be conducted on the crypto module 504. For example, instructions may be stored in the lattice-based crypto core 508 or they may be provided by, the CPU 501 via the bus 505. Data may be stored locally with any of the crypto cores 508 to 511. It is also an option that the data is temporarily stored in the RAM 502 or the NVM 503. The lattice-based crypto core 508 may also use other crypto modules to provide supporting functions (e.g., expansion of pseudo random data), The lattice-based crypto core 508 may also comprise a hardware-random number generator or a means to generate physical and/or software random numbers.

The processing device 500 may be a chip card powered by direct electrical contact or through an electro-magnetic field. The processing device 500 may be a fixed circuit or based on reconfigurable hardware (e.g., Field Programmable Gate Array, FPGA). The processing device 500 may be coupled to a personal computer, microcontroller, FPGA or a smart phone.

Figure 5:
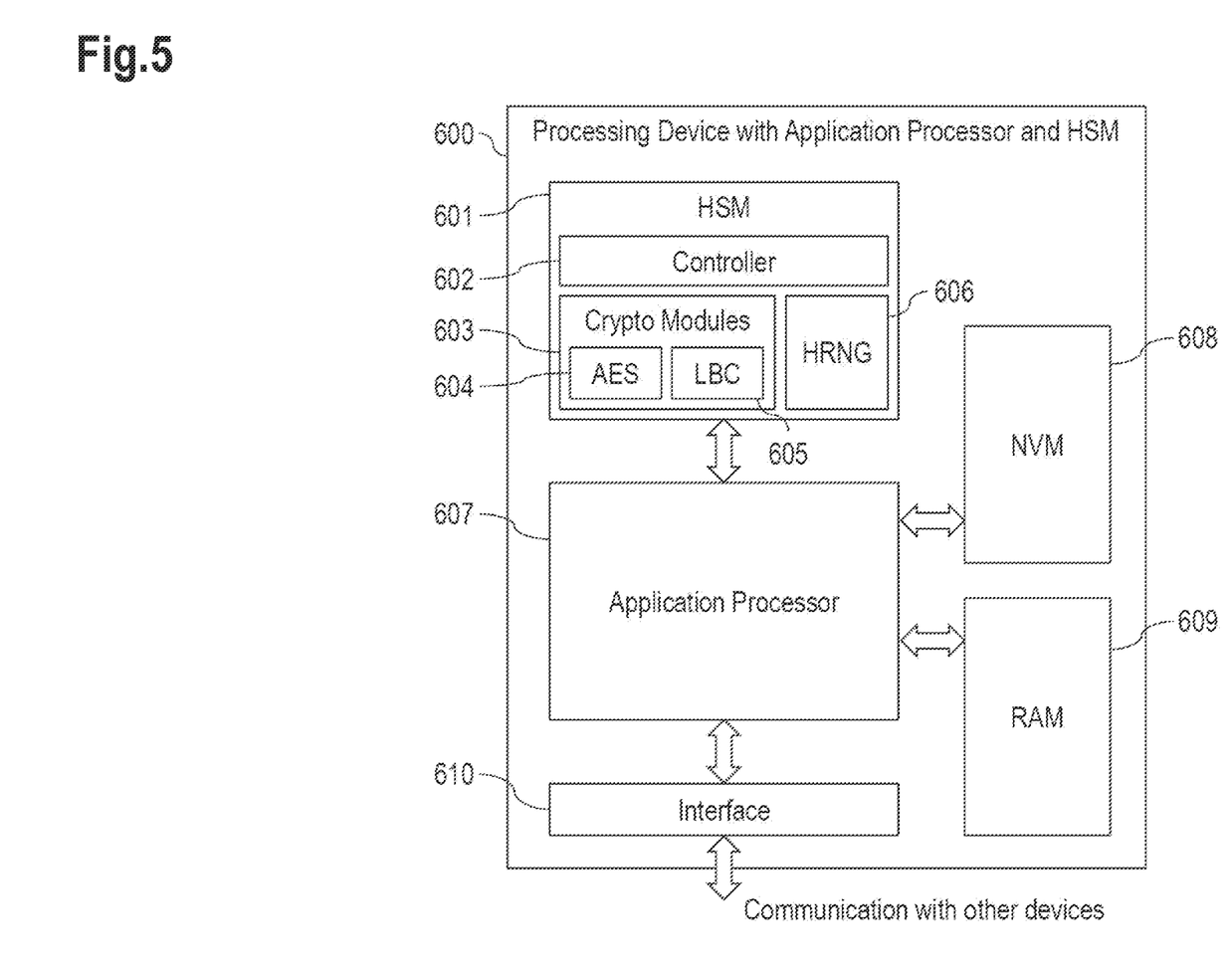
FIG. 5 shows an alternative arrangement with a hardware security module (HSM).

FIG. 5 shows another example of a processing device 600. The processing device 600 comprises a hardware security module 601, a non-volatile memory (NVM) 608, a random access memory (RAM) 609, an interface 610 for communication with other devices and an application processor 607, which is coupled to the hardware security module (HSM) 601, the RAM 609, the NVM 608 and the interface 610.

The HSM 601 comprises a controller 602, a hardware-random number generator (HRNG) 606 and at least one crypto module 603. The crypto module 603 exemplarily comprises an AES core 604 and a Lattice-based crypto (LBC) core 605.

According to one embodiment, the HSM 601 and the application processor 607 may be fabricated on the same physical chip with a tight coupling. The HSM 601 delivers cryptographic services and secured key storage while the application processor may perform computationally intensive tasks (e.g., image recognition, communication, motor control), The HSM 601 may be only accessible by a defined interface and considered independent of the rest of the system in a way that a security compromise of the application processor 607 has only limited impact on the security of the HSM 601. The HSM 601 may perform all tasks or a subset of tasks described with respect to the processing device 600 by using the controller 602, the LBC 605, supported by, exemplary, an AES 604 and the HRNG 606. It may execute the procedures described herein (at least partially) either controlled by an internal controller or as CMOS circuit. Moreover, also the application processor 607 may perform the procedures described herein (at least partially, e.g., in collaboration with the HSM 601).

The processing device 600 with this application processor 607 and HSM 601 may be used as a central communication gateway or (electric) motor control unit in cars or other vehicles.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that, be accessed by one or more computers or one or more processors to retrieve instructions, code and/or data structures for implementation of the techniques described in this disclosure. A computer program product may include a computer-readable medium.

By way of example, and not, limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL) or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware nits, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims,

LIST OF REFERENCES

[NewHopeNist17] NewHope—Submission to the NIST post-quantum project. Erdem Alkim, Roberto Avanzi, Joppe Bos, Léo Ducas, Antonio de la Piedra, Thomas Pöppelmann, Peter Schwabe, Douglas Stebila. See https://csrc.nist.gov/Projects/Post-Quantum-Cryptography/Round-1-Submissions

[NewHopeSimplePaperEprint16] Erdem Alkim, Léo Ducas, Thomas Pöppelmann, Peter Schwabe: NewHope without reconciliation. IACR Cryptology ePrint Archive 2016: 1157 (2016).

[NewHopePaperEprint16] Erdem Alkim, Léo Ducas, Thomas Pöppelmnann, Peter Schwabe: Post-quantum key exchange—a new hope. IACR Cryptology ePrint Archive 2015: 1092 (2015)

[OSPG18] T. Oder, T. Schneider, T. Pöppelmann and T. Güneysu: Practical CCA2-Secure and Masked Ring-LWE Implementation, IACR Eprint, 23 Jan. 2018 (accessed 15 Jun. 2018), https://eprint/iacr.org/2016/1109.pdf

[LPR10A] Vadim Lyubashevsky, Chris Peikert, Oded Regev.: On Ideal Lattices and Learning with Errors Over Rings, Journal of the ACM, 60(6):43:1-43:35. Preliminary version in Eurocrypt 2010. https://web.eecs.umich.edu/~cpeikert/pubs/ideal-lwe.pdf

[LPR10B] Vadim Lyubashevsky, Chris Peikert, Oded Regev.: On Ideal Lattices and Learning with Errors Over Rings, Slides presented at Eurocrypt 2010, https://web.eecs.umich.edu/~cpeikert/pubs/slides-ideal-lwe.pdf

What is claimed is:

1. A method for compiling a cryptographic information, comprising:
 (a) determining a first portion of the cryptographic info nation based on are input, and a randomness;
 (b) checking whether a rejection criterion based on the first portion of the cryptographic information is fulfilled; and
 (c) re-starting step (a) with a new randomness in the event the rejection criterion is fulfilled with respect to the first portion of the cryptographic information; and,
 (d) for each of any subsequent portion of the cryptographic information not yet determined,
  (d1) determining a subsequent portion of the cryptographic; information based on the input and the most recently used randomness,
  (d2) checking whether the rejection criterion is fulfilled based on the subsequent portion of the cryptographic information, and
  (d3) re-starting step (a) with a new randomness in the event the rejection criterion is fulfilled with respect to the respective subsequent portion of the cryptographic information; and
 (e) responsive to the first portion and each subsequent portion being determined without any respective events of fulfillment of the rejection criterion:
  (e1) determining the first portion of the cryptographic information again, based on the input and the most recently used randomness and conveying the determined first portion of the cryptographic information; and (e2) determining each subsequent portion of the cryptographic information again, based on the input and the randomness, and conveying each determined subsequent portion.

2. The method of claim 1, wherein the method comprises not storing more than one portion of the cryptographic information at one time when processing the loop determined by steps (a) to (d).

3. The method of claim 1, wherein the method comprises not storing more than one determined portion of the cryptographic information at one time when performing steps (e1) and (e2).

4. The method of claim 1, wherein said determining the first portion each subsequent portion of the cryptographic information again and conveying the determined first portion and each determined subsequent portion comprises, for each portion determined again, conveying the portion determined again before determining any further portion again.

5. The method of claim 1, further comprising:
for each portion of the cryptographic information determined by the loop of steps (a) to (d), generating and storing a first hash value that is associated with the respective portion of the cryptographic information;
within step (e), generating a second hash value for each portion of the cryptographic information and comparing the second hash value with the first hash value that is associated with the same portion of the cryptographic information; and
conveying the respective portion only if the first hash value corresponds to the second hash value.

6. The method of claim 5, wherein in the event that the first hash value does not correspond to the second hash value, the method further comprises triggering at least one of any one or more of the following actions:
issuing a notification or an alarm;
stopping the method;
entering an exception handling;
re-starting step (a) with a different randomness.

7. The method of claim 1, wherein the cryptographic information is or comprises at least one of any one or more of the following:
a signature;
a pairing information;
an information associated with a zero-knowledge-proof.

8. The method of claim 1, wherein the method further comprises:
encrypting each portion of the cryptographic information with a secret key, prior to conveying the respective portion; and
conveying the secret key.

9. The method of claim 8, wherein the secret key is conveyed after the last encrypted portion of the cryptographic information has been conveyed.

10. The method of claim 1, wherein the input is a message.

11. The method of claim 1, wherein the cryptographic information is compiled based on the portions of the cryptographic information conveyed.

12. The method of claim 11, comprising conducting an authentication based on the cryptographic information.

13. The method of claim 1, wherein processing the cryptographic information or a portion of the cryptographic information utilizes at least one cryptographic Lattice operation.

14. The method of claim 1, wherein used on a security device or for operating a security device, wherein such security device comprises at least one of any one or more of the following:
an integrated circuit,
a hardware security module,
a trusted platform module,
a crypto unit,
a FPGA,
a processing unit,
a controller,
a smartcard.

15. A security device for compiling a cryptographic information, the security device comprising digital hardware and interface circuitry configured to:
(a) determine a first portion of the cryptographic information based on an input and a randomness;
(b) check whether a rejection criterion based on the first portion of the cryptographic information is fulfilled; and
(c) re-start step (a) with a new randomness in the event the rejection criterion is fulfilled with respect to the first portion of the cryptographic information; and,
(d) for each of any subsequent portion of the cryptographic information not yet determined,
(d1) determine a subsequent portion of the cryptographic information based on the input and the most recently used randomness,
(d2) check whether the rejection criterion is fulfilled based on the subsequent portion of the cryptographic information, and
(d3) re-start step (a) with a new randomness in the event the rejection criterion is fulfilled with respect to the respective subsequent portion the cryptographic inform ration; and
(e) responsive to the first portion and each subsequent portion being determined without any respective events of fulfillment of the rejection criterion:
(e1) determine the first portion of the cryptographic information again, based on the input and the most recently used randomness, and conveying the determined first portion of the cryptographic information; and
(e2) determine each subsequent portion of the cryptographic information again, based on the input and the randomness, and conveying each determined subsequent portion.

16. The security device of claim 15, wherein the digital hardware is configured to not store more than one portion of the cryptographic information at one time when performing steps (e1) and (e2).

17. The security device of claim 15, wherein the digital hardware and interface circuitry are configured to determine the first portion and each subsequent portion of the cryptographic information again and convey the determined first portion and each determined subsequent portion such that each portion determined again is conveyed before any further portion is determined again.

18. A consumable comprising the security device of claim 15.

19. A system comprising a security device according to claim 15 and a host, wherein the security device is arranged to convey the respective portion of the cryptographic information to the host.

20. The system of claim 17, wherein the host is arranged to authenticate the security device based on the portions of the cryptographic information received.

21. A non-transitory computer-readable medium comprising, stored thereupon, a computer program product directly loadable into a memory of a digital processing device, the computer program product comprising software code portions for performing the steps of the method of claim 1.

* * * * *

UNITED STATES PATENT AND TRADEMARK OFFICE
CERTIFICATE OF CORRECTION

PATENT NO.         : 12,273,464 B2
APPLICATION NO.    : 18/541533
DATED              : April 8, 2025
INVENTOR(S)        : T. Poeppelmann Page 1 of 1

It is certified that error appears in the above-identified patent and that said Letters Patent is hereby corrected as shown below:

In the Claims

Column 18, Lines 53-54 (Claim 1, Lines 13-14), please change "cryptographic;" to
-- cryptographic --.

Column 20, Line 1 (Claim 14, Line 1), please change "wherein used" to -- wherein the method is used --.

Column 20, Line 34 (Claim 15, Line 22), please change "portion the" to -- portion of the --.

Column 20, Line 35 (Claim 15, Line 23), please change "inform ration" to -- information --.

Signed and Sealed this
Eighth Day of July, 2025

Coke Morgan Stewart
*Acting Director of the United States Patent and Trademark Office*